United States Patent
Naffziger et al.

(10) Patent No.: US 8,463,973 B2
(45) Date of Patent: Jun. 11, 2013

(54) MECHANISM FOR VOLTAGE REGULATOR LOAD LINE COMPENSATION USING MULTIPLE VOLTAGE SETTINGS PER OPERATING STATE

(75) Inventors: Samuel D. Naffziger, Fort Collins, CO (US); Alexander Branover, Chestnut Hill, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 311 days.

(21) Appl. No.: 12/872,414

(22) Filed: Aug. 31, 2010

(65) Prior Publication Data

US 2012/0054515 A1    Mar. 1, 2012

(51) Int. Cl.
*G06F 1/00*    (2006.01)
*G06F 1/32*    (2006.01)

(52) U.S. Cl.
USPC .......................................... 710/300; 713/320

(58) Field of Classification Search
USPC .................. 713/300, 310, 320, 323–324, 340
See application file for complete search history.

(56) References Cited

U.S. PATENT DOCUMENTS

| | | | | |
|---|---|---|---|---|
| 5,764,529 | A * | 6/1998 | Capps et al. ................... | 716/138 |
| 2001/0045815 | A1* | 11/2001 | Muratov et al. ............... | 323/280 |
| 2002/0087896 | A1* | 7/2002 | Cline et al. .................... | 713/300 |
| 2002/0138778 | A1 | 9/2002 | Cole | |
| 2003/0065960 | A1 | 4/2003 | Rusu | |
| 2004/0003301 | A1* | 1/2004 | Nguyen ......................... | 713/300 |
| 2004/0125514 | A1* | 7/2004 | Gunther et al. ................ | 361/1 |
| 2004/0236972 | A1* | 11/2004 | Brown et al. .................. | 713/300 |
| 2006/0047986 | A1* | 3/2006 | Kurts et al. .................... | 713/320 |
| 2008/0104423 | A1* | 5/2008 | Boecker et al. ............... | 713/300 |
| 2008/0201591 | A1* | 8/2008 | Hu et al. ........................ | 713/323 |
| 2009/0167270 | A1* | 7/2009 | Lam et al. ...................... | 323/283 |
| 2009/0167282 | A1* | 7/2009 | Koertzen et al. .............. | 323/318 |
| 2009/0313485 | A1* | 12/2009 | Huang ........................... | 713/300 |
| 2010/0083009 | A1* | 4/2010 | Rotem et al. .................. | 713/300 |
| 2011/0154066 | A1* | 6/2011 | Ravichandran et al. ...... | 713/300 |
| 2011/0191602 | A1* | 8/2011 | Bearden et al. ............... | 713/300 |

* cited by examiner

*Primary Examiner* — Thomas J Cleary
(74) *Attorney, Agent, or Firm* — Meyertons, Hood, Kivlin, Kowert & Goetzel, LLC

(57) ABSTRACT

A system includes one or more processor cores, and a voltage regulator that provides an operating voltage to the one or more processor cores in response to receiving a voltage identifier signal that is indicative of the operating voltage. The system also includes a power management unit that may provide a first voltage identifier signal corresponding to a first operating voltage in response to determining that the processor cores are operating in a first operating state in which the one or more processor cores may draw up to a maximum load current. The power management unit may also provide a second voltage identifier signal corresponding to a second operating voltage, which is less than the first operating voltage, in response to determining that the processor cores are operating in a second operating state in which the processor cores are incapable of an increase in load current above a predetermined amount.

11 Claims, 4 Drawing Sheets

MECHANISM FOR VOLTAGE REGULATOR LOAD LINE COMPENSATION USING MULTIPLE VOLTAGE SETTINGS PER OPERATING STATE

BACKGROUND

1. Technical Field

This disclosure relates to voltage supply control and, more particularly, to control mechanisms for voltage supplies of microprocessors.

2. Description of the Related Art

Computer system processors typically require precise voltages during operation. Accordingly, these computer systems typically employ tightly controlled voltage regulators with multiple voltage settings. The voltage settings are generally selected through the use of voltage identification (VID) signals. One mechanism to obtain tight control over the output voltage is to use some form of load line compensation. In many systems, for each output voltage, a particular load line may be used that defines a voltage range within which the output voltage may vary as the load current varies from a minimum up to a maximum current for the given voltage setting. More particularly, load line voltage ranges may be tuned such that as the load current increases up to the maximum, the output voltage may be reduced from a maximum voltage to a minimum voltage for that voltage setting. This type of load line may take advantage of the fact that exposure to frequency-impacting voltage droops is lower at high load conditions than at low load conditions. Thus, the output voltage may be lower at maximum current which may reduce the power consumption.

However, there are some drawbacks to such load line compensated regulators. For example, to reduce the exposure to (i.e., a voltage droop caused by) sudden increases in load current, when the load currents are low, the load line dictates that the output voltage be increased to some suitable voltage that will reduce the exposure. Thus although this type of load line compensation may be an appropriate control mechanism for moderate to heavy loads, lightly loaded regulators may consume more power than is necessary due to the higher supply voltage. This may be especially undesirable in battery-operated systems or any system concerned with power savings.

SUMMARY OF THE EMBODIMENTS

Various embodiments of a system including a power management unit for compensating a load line of a voltage regulator are disclosed. Broadly speaking, a power management unit of a processing node may be configured to provide multiple voltage identifiers for each operating state. Thus the voltage output indicated by the load line associated with the voltage regulator may be lowered from the nominal voltage output for the processing node when the processor cores are operating in state that would not allow a sudden increase in load current that would cause a corresponding voltage droop. Accordingly, in using a lower voltage when the processor cores are drawing a light load current, a power savings may be realized over using the load line output voltage with a nominal voltage identifier.

In one embodiment, the system includes one or more processor cores, and a voltage regulator that provides an operating voltage to the one or more processor cores in response to receiving a voltage identifier signal that is indicative of the operating voltage. The system also includes a power management unit that may provide a first voltage identifier signal corresponding to a first operating voltage in response to determining that the one or more processor cores is operating in a first operating state in which the one or more processor cores is configured to draw up to a maximum load current. The power management unit may also provide a second voltage identifier signal corresponding to a second operating voltage in response to determining that the one or more processor cores is operating in a second operating state in which the one or more processor cores is incapable of an increase in load current above a predetermined amount. The second operating voltage is less than the first operating voltage.

In one specific implementation, the power management unit may provide a voltage identifier signal to increase the operating voltage to the first operating voltage in response to detecting a request to change the operating state to a third operating state in which the one or more processor cores is configured to draw more current than a current operating state. However, the power management unit may inhibit the request to change the operating state to the third operating state until the voltage regulator has increased the operating voltage to the first operating voltage.

Figure 1:
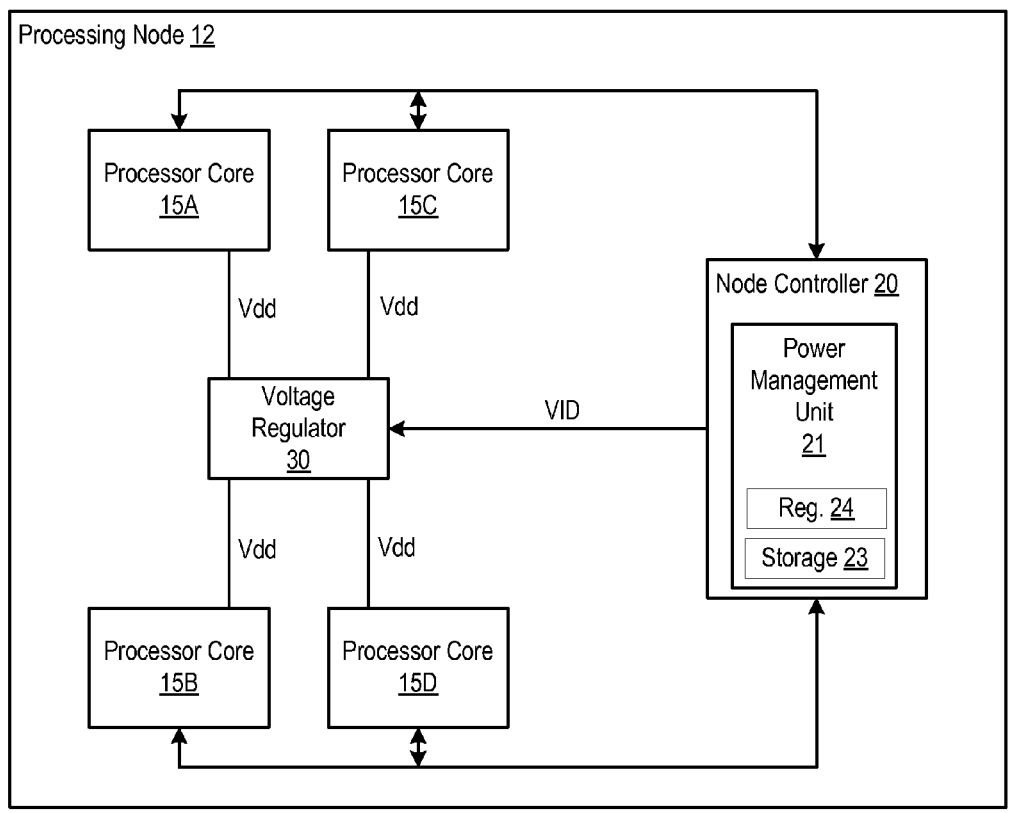
FIG. 1 is a block diagram of one embodiment of a processing node including a plurality of processor cores.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

DETAILED DESCRIPTION

Turning now to FIG. 1, a simplified block diagram of one embodiment of a processing node is shown. In the illustrated embodiment, the processing node 12 includes processor cores 15A-15D coupled to a node controller 20 and to a voltage regulator 30. In one embodiment, node 12 may be a single integrated circuit chip comprising the circuitry shown therein in FIG. 1. That is, node 12 may be a chip multiprocessor (CMP). Other embodiments may implement the node 12 as two or more separate integrated circuits, as desired. Any level of integration or discrete components may be used. It is noted that components having a number and a letter as a reference designator may be referred to by the number only where appropriate.

It is also noted that although node 12 of FIG. 1 includes four processor cores 15, a processing node such as node 12 may include any number of processor cores in various embodiments. It is further noted that processor node 12 may include many other components that have been omitted here for simplicity. For example, in various embodiments processing node 12 may include an integral memory controller and various communication interfaces for communicating with other nodes, and I/O devices.

Generally, a processor core (e.g., 15A-15D) may include circuitry that is designed to execute instructions defined in a given instruction set architecture. That is, the processor core circuitry may be configured to fetch, decode, execute, and store results of the instructions defined in the instruction set architecture. For example, in one embodiment, processor cores 15A-15D may implement the x86 architecture. The processor cores 15A-15D may comprise any desired configurations, including superpipelined, superscalar, or combinations thereof. Other configurations may include scalar, pipelined, non-pipelined, etc. Various embodiments may employ out of order speculative execution or in order execution.

In one embodiment, node controller 20 may include various interconnection circuits (not shown) for interconnecting processor cores 15A through 15D to each other, to other nodes, and to a system memory (not shown). As shown, the node controller 20 includes a power management unit 21 that may be configured to control the amount of power consumed by each processor core 15 and therefore, the amount of heat generated. The power management unit 21 may be configured to control the operating frequency for each core 15 using frequency control signals (not shown) and the power supply operating voltage for the node 12 using the voltage identification (VID) signals provided to the voltage regulator 30. As described further below in conjunction with the description of FIG. 2 and FIG. 3, the power management unit 21 may be configured to provide a plurality of VID codes to the voltage regulator 30 dependent upon the operating state of the processing node since the more processor cores 15 that enter an IDLE or non-C0 state, the exposure to a sudden burst or increase in load current that would lead to a voltage droop is reduced. It is noted that the power management unit 21 is shown as part of the node controller 20 in FIG. 1. In one embodiment, the power management unit 21 functionality of the node controller 20 shown in FIG. 1 may be part of a Northbridge of the processing node 12. However, it is contemplated that in other embodiments, the power management unit 21 functionality of the node controller 20 may be part of a separate embedded microcontroller unit (not shown) within the processing node 12.

The processing node 12 may operate in one of several operating states. More particularly, the advanced configuration and power interface (ACPI) specification defines a number of operating states for computing platforms, processors, and devices. Processor power states, which are referred to as C-states (e.g., C0, C1, C2, C3, etc.), determine whether the processing node 12 is operating, or in one or more halt or sleep states. The C0 state is the operating state, while C1 is a halt state, and C3 is a sleep state. Processor performance states, which are referred to as P-states (e.g., P0, P1, P2, ... Pn, etc.), are a predefined set of frequency and voltage combinations at which the processing node 12 operates. Unlike other ACPI defined power states, such as C1, C2, etc., the processor is actually executing instructions in all P-states, which are sub-states of C0. P0 is defined as the maximum performance/highest power consuming state, while P1 through Pn are lower performance states and thus typically have a lower voltage/frequency combination for each state.

Typically, operating the processing node 12 at higher frequencies allows higher performance, but to achieve the higher frequency operation, the operating voltage needs to be higher as well, which makes the processing node 12 consume more power. In one embodiment, an operating system or any other high-level SW or firmware can dynamically change the performance state during operation to tradeoff between power and performance using, for example, one or more processing node operating state registers 24 within the power management unit 21.

In addition to the processing node operating/power states, each processor core 15 may operate independently in a given state. These core states are sometimes referred to as CC-states. However, the processing node 12 operating/power state may take on the power state of the processor core with the highest power state. For example, if processor core 15A is in CC0, and processor cores 15B-15D are in power state CC6, the power state of the processing node 12 is still considered to be C0, even though the power consumed by the one core may be less than if all four cores were operating in CC0. Accordingly, the power management unit 21 may be configured to keep track of the operating state of each processor core 15. In addition, as described further below, the power management unit 21 may be configured to provide more than one VID code to the voltage regulator 30 for each operating state dependent upon the combination of operating states of the processor cores 15. In one embodiment, power management unit 21 may maintain a table of VID codes that correspond to the various combinations of operating states of the processor cores. Table 1 below illustrates an exemplary operating state and operating voltage matrix that may be maintained by the power management unit 21 within storage 23, for example. Thus, for a given operating state, the power management unit 21 may select one of several VID codes (and thus operating voltages) for the voltage regulator 30.

TABLE 1

| Operating voltage per operating state | | | | |
|---|---|---|---|---|
| Core 0 | Core 1 | Core 2 | Core 3 | Voltage |
| P0 | P0 | P0 | P0 | Nom. |
| CC1 | P0 | P0 | P0 | −20 mV |
| ... | | | | |
| CC1 | CC1 | P0 | P0 | −40 mV |

TABLE 1-continued

Operating voltage per operating state

| Core 0 | Core 1 | Core 2 | Core 3 | Voltage |
|--------|--------|--------|--------|---------|
| CC1    | CC1    | P1     | P0     | −50 mV  |
| ...    |        |        |        |         |
| CC2    | CC1    | CC1    | P0     | −60 mV  |
| CC2    | CC1    | CC1    | P2     | −70 mV  |
| ...    |        |        |        | −80 mV  |

Figure 2A:
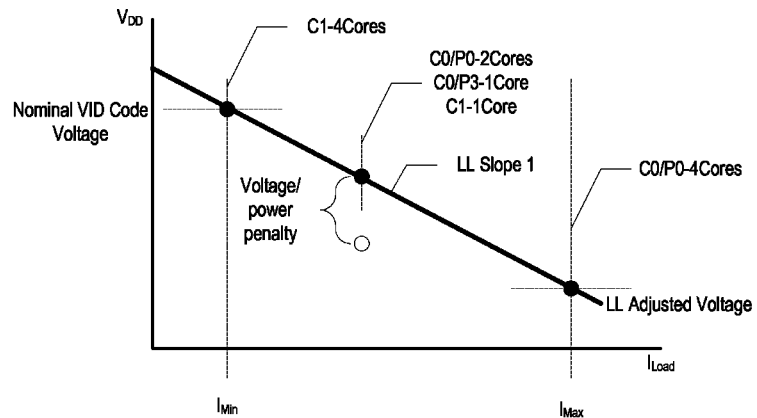
FIG. 2A is a diagram depicting a plot of an output voltage as a function of load current for one embodiment of the voltage regulator shown in FIG. 1.
Figure 2B:
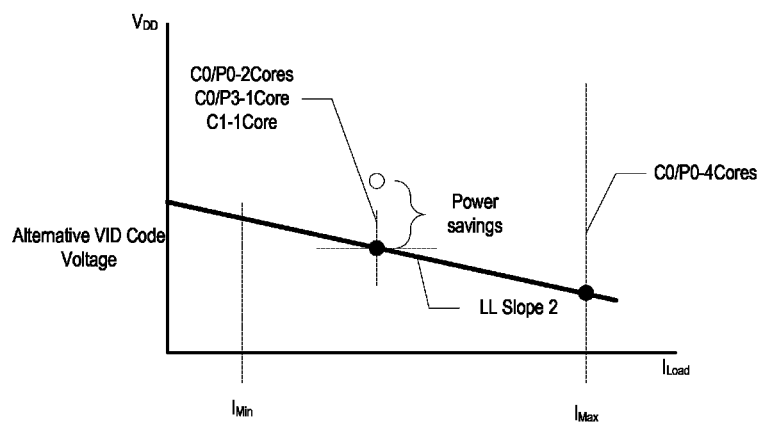
FIG. 2B is a diagram depicting a plot of an output voltage as a function of load current for another embodiment of the voltage regulator shown in FIG. 1.

As shown in row one of Table 1, each of the cores is operating in power state CC0 and also performance state P0, thus the power management unit 21 sends a VID code indicating that the voltage regulator should use the nominal voltage (e.g., 1.2V) as the $V_{max}$. In row two however, core 0 is in power state CC1, while the remaining cores are in P0. Thus, the power management unit 21 sends a VID code indicating that the voltage regulator should use a −20 mV offset from the nominal voltage as the $V_{max}$. Similarly for the remaining rows, as more of the cores enter non-operational states, the current load, and thus the operating voltage, is reduced. Since various ones of the cores are halted or otherwise not executing instructions in rows two through eight, the exposure to a sudden burst in current is reduced. Thus rather than using the nominal voltage under low load conditions, the power management unit 21 sends a lower voltage VID code, so that the voltage regulator 30 can lower the output voltage, thereby overriding the load line compensation $V_{max}$ provided by the voltage regulator 30. This operation is illustrated in FIG. 2A and FIG. 2B and described below. FIG. 2A is a diagram depicting the output voltage versus the load current of the voltage regulator 30 using a load line compensated output, while FIG. 2B is a diagram depicting the output voltage versus the load current of the voltage regulator 30 using a modified load line compensated output.

As mentioned above, the voltage regulator 30 may be configured to provide an operating voltage (e.g., Vdd) to the processor cores 15 in response to a VID code. In one embodiment, the voltage regulator 30 may be configured to provide that operating voltage according to a load line algorithm. Accordingly, as the load current of the processor cores 15 increases from a minimum to a maximum current, the voltage regulator 30 may decrease the operating voltage from a nominal voltage indicated by the VID code to the nominal voltage less some offset. This reduction in voltage is a calculated decrease based upon the reduced risk of a sudden increase in current at that voltage. Since the current is at a maximum, it can't surge suddenly and cause a voltage droop. Thus, the load line dictates the operating point that can be reduced to calculated lower voltage for the given operating state and frequency. The reduction of operating voltage from a nominal value as current increases is determined by the slope of the load line that is used by the voltage regulator 30. However, as discussed above, the load line compensation may keep the output voltage at a higher value than necessary when the load current is at a minimum, or less than the maximum.

Referring to FIG. 2A, the vertical axis represents the VDD voltage output of the voltage regulator, while the horizontal axis represents the load current drawn by the processor cores 15. As shown, with all four cores in the CC1 state, the load line dictates that the output voltage be at the nominal voltage indicated by the VID code to reduce the exposure to a sudden increase in load current. In the case where all four of the processor cores 15 are in the CC1 state, any power that would have been lost due to a higher than necessary VDD is mitigated by the fact that the cores are halted. When all four processor cores 15 are in the C0 state, and the load current is at the maximum, the load line dictates a lower than nominal voltage, since the current can't increase suddenly. The voltage difference between the nominal voltage and the load line adjusted voltage represents a power savings. However, when some cores are operational and some cores are not, or are in a less than P0 performance state as shown by the middle point on the load line slope 1, the output voltage indicated by the load line based upon the load current may be higher than necessary. More particularly, since two cores are in the C0/P0 state, one core is in the C0/P3 state, and one core is in the CC1 state, the current can't suddenly increase (i.e., the processors will maintain a particular current below a predetermined threshold amount) without changing the core state between IDLE (non-C0) and active (C0). Thus, the output voltage could be set to a level represented by the unfilled circle. The difference between that lower voltage and the load line voltage is a voltage penalty that translates into excess power consumption.

Accordingly, as described above the power management unit 21 is configured to provide additional VID codes that are based upon the combination of power/performance states of the processor cores. As such, the power management unit 21 may determine that a lower output voltage may be used for the power/performance state combination shown in FIG. 2A. Thus, the power management unit 21 may send a different VID code than the nominal VID code once the cores enter their respective states. In one embodiment the VID code may represent a predetermined voltage offset from the nominal voltage. In an alternative embodiment, the new VID code may cause the voltage regulator to change the slope of the load line, so that a lower voltage may be used when the load current is at a minimum or less than maximum.

Referring to FIG. 2B, the output voltage is lower than that shown in FIG. 2A for the operating state in which two cores are in the C0/P0 state, one core is in the C0/P3 state, and one core is in the CC1 state. The difference between that alternate VID code voltage and the previous load line voltage is shown as a power savings. As mentioned above, the new VID code may cause the voltage regulator 30 to use a new load line having a new slope (e.g., LL slope 2).

However, to prevent any of the processor cores 15 from changing to a new operating state (e.g., from IDLE or non-C0 state to active or C0 state) that could cause a sudden increase in load current, the power management unit 21 is configured to monitor any indications that a change is about to happen. If the power management unit 21 detects a change, in one embodiment the power management unit 21 may be configured to inhibit or lock out the change from taking place and to send the VID code for the nominal voltage for the C0 power state prior to allowing the change to occur. In another embodiment, the power management unit 21 may be configured to send the VID code for the nominal voltage for the new operating state. Once the voltage regulator 30 changes the output voltage, the power management unit 21 may allow the operating state change. In another embodiment, the power management unit 21 may slow the processor cores 15 down by lowering the operating frequency to some predetermined frequency until the voltage has been changed.

In one embodiment, to implement the lockout mechanism, if an attempt to change the operating state (e.g., frequency/voltage combination) of any of the processor cores 15 is detected, the power management unit 21 may not allow the change to occur until the voltage has been changed. More particularly, in one embodiment, an enable/disable signal may be asserted that prevents values within registers 24 from being overwritten. The write values may be captured and held in shadow registers, for example. Alternatively, one or more enable signals may be used to gate the newly written values from affecting the downstream circuits. In another embodiment, the power management unit 21 may be configured to analyze each request, and to only inhibit those requests that may cause an increase in load current. For example, if the request only changes one core from the CC1 to the CC6 (i.e., power off) state, the change may be allowed immediately.

Figure 3:
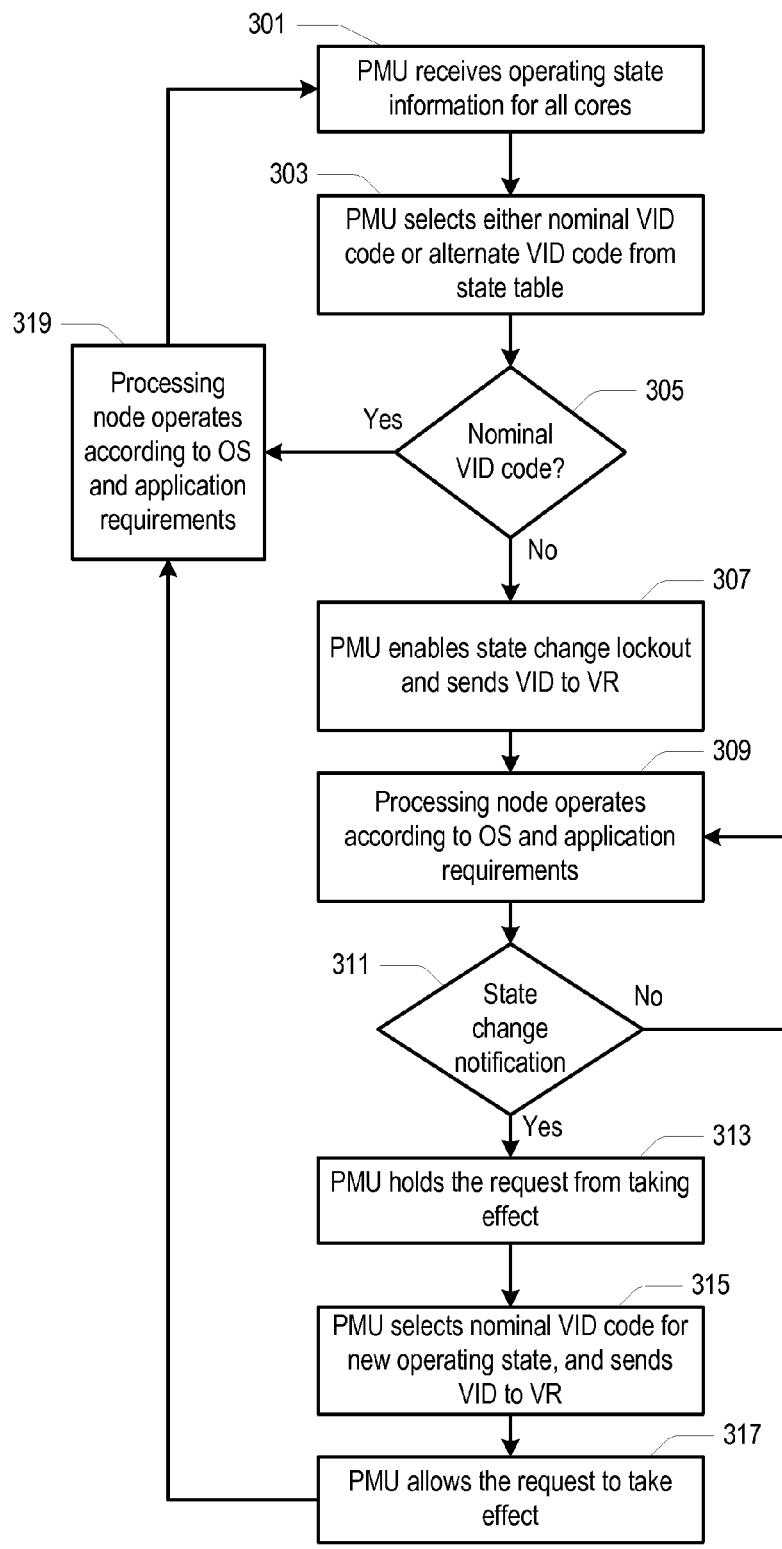
FIG. 3 is a flow diagram describing operational aspects of the voltage control flow of the processing node of FIG. 1.

In FIG. 3, a flow diagram describing operational aspects of the processing node of FIG. 1 is shown. Referring collectively now to FIG. 1 and FIG. 3, and beginning in block 301 of FIG. 3, the power management unit 21 receives operating state information about all processor cores 15 and stores that information within registers 24. In one embodiment, the power management unit 21 receives operating state requests from the OS. These requests may be read requests for operating state information that is maintained by the power management unit 21, or the requests may be write requests to change the operating state for one or more of the processor cores 15. In other embodiments, the request may come from sources internal to the power management unit 21 in response to thermal or power set points being exceeded. In this example, the requests are write requests to change or initialize the operating state. Accordingly, in response to the request, the power management unit 21 selects a particular VID code from the operating state and operating voltage matrix stored within storage 23 (block 303).

If the selected VID code is the nominal VID code for the requested operating state that was requested by the OS (block 305), the power management unit 21 sends the VID code to the voltage regulator 30, and the appropriate frequency and/or operating state signals to the processor cores 15, and the processing node 12 operates according to the OS and application requirements (block 319). However, if the VID code is an alternative VID code for the requested operating state (block 305), the power management unit 21 enables a state change lockout that prevents a change in the operating state until the operating voltage can be changed to the nominal voltage for the requested operating state, as described above (block 307). Once the lockout is enabled, the power management unit 21 sends the VID code to the voltage regulator 30. The processing node 12 operates according to the OS and application requirements (block 309).

If the power management unit 321 receives a state change request (block 311), the power management unit 21 may hold the state change request from being implemented as described above (bock 313).

The power management unit 21 selects the nominal VID code for the requested operating state, and sends the VID code to the voltage regulator 30 (block 315). After some predetermined amount of time, the power management unit 21 allows the requested operating state change to take effect. Operation proceeds as described above in the description of block 319 in which the processing node 12 operates according to the OS and application requirements.

It is noted that the embodiments above have been described in the context of controlling of the operating voltage of the processor cores 15. However, it is noted that a similar mechanism may be employed in controlling the operating voltage of the node controller 20 and a graphics processing unit (GPU) (not shown), that may be included within processing node 12. More particularly, in some embodiments, another voltage regulator (not shown) may provide the operating voltage to the node controller 20 and the GPU, thereby creating another voltage domain. The power management unit 21 may be further configured to monitor the operating states of the GPU and/or the node controller 20 in a way similar to the processor cores 15. Accordingly, if the GPU and/or the node controller 20 enters one or more states in which the load current drawn cannot suddenly increase above a threshold amount or in which the load current is maintained below the given threshold amount, the power management unit 21 may be configured to lower the voltage to the GPU, the node controller 20 or both, to conserve power, and then raise the voltage in response to detecting a change in the operating state of the GPU, the node controller 20 or both, that would increase the load current.

Figure 4:
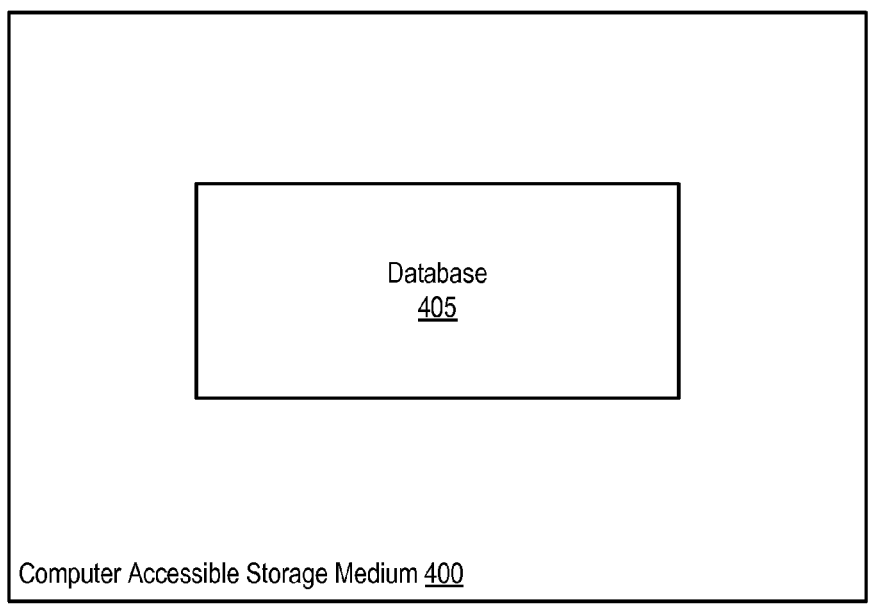
FIG. 4 is a block diagram of a computer accessible storage medium including a database representative of the processing node of FIG. 1.

Turning to FIG. 4, a block diagram of a computer accessible storage medium 400 including a database 405 representative of the processing node 12 of FIG. 1 is shown. Generally speaking, a computer accessible storage medium 400 may include any non-transitory storage media accessible by a computer during use to provide instructions and/or data to the computer. For example, a computer accessible storage medium 400 may include storage media such as magnetic or optical media, e.g., disk (fixed or removable), tape, CD-ROM, or DVD-ROM, CD-R, CD-RW, DVD-R, DVD-RW, or Blu-Ray. Storage media may further include volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link.

Generally, the database 405 of the processing node 12 carried on the computer accessible storage medium 400 may be a database or other data structure which can be read by a program and used, directly or indirectly, to fabricate the hardware comprising the processing node 12. For example, the database 405 may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the processing node 12. The netlist may then be placed and routed to produce a data set describing geometric shapes to be applied to masks. The masks may then be used in various semiconductor fabrication steps to produce a semiconductor circuit or circuits corresponding to the processing node 12. Alternatively, the database 405 on the computer accessible storage medium 400 may be the netlist (with or without the synthesis library) or the data set, as desired.

While the computer accessible storage medium 400 carries a representation of the processing node 12, other embodiments may carry a representation of any portion of the processing node 12, as desired.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
   one or more processor cores;
   a voltage regulator configured to provide an operating voltage to the one or more processor cores in response to receiving a voltage identifier signal that is indicative of the operating voltage; and
   a power management unit coupled to the voltage regulator and configured to provide a first voltage identifier signal corresponding to a first operating voltage in response to determining that the one or more processor cores is operating in a first operating state in which the one or more processor cores is configured to draw up to a maximum load current;
   wherein the power management unit is configured to provide a second voltage identifier signal corresponding to a second operating voltage in response to determining that the one or more processor cores is operating in a second operating state in which the one or more processors is configured to maintain a load current below a predetermined amount;
   wherein the second operating voltage is less than the first operating voltage, and wherein the second operating voltage is less than a nominal operating voltage for the second operating state;
   wherein in response to detecting a request to change the operating state to a third operating state in which the one or more processor cores is configured to draw more current than a current operating state, the power management unit is configured to provide a voltage identifier signal to increase the operating voltage to the first operating voltage; and
   wherein the power management unit is configured to delay the request to change the operating state to the third operating state until the voltage regulator has increased the operating voltage to the first operating voltage.

2. The system as recited in claim 1, wherein an operating system executing on a given one of the processor cores is configured to request the change to the third operating state.

3. The system as recited in claim 1, wherein the one or more processor cores is configured to operate in a plurality of operating states, wherein a given operating state corresponds to a combination of a performance state and a power state of each of the one or more processor cores.

4. The system as recited in claim 3, wherein the power management unit is configured to maintain a table that includes the plurality of operating states and a respective voltage identifier signal that corresponds to each operating state.

5. The system as recited in claim 4, wherein the power management unit includes a storage for storing the table.

6. The system as recited in claim 1, wherein the voltage regulator is configured to provide the operating voltage based upon a load line compensation of the first operating voltage indicated by the first voltage identifier signal, wherein the voltage regulator is further configured to reduce the first operating voltage in response to determining the one or more processor cores is drawing a maximum load current.

7. A system comprising:
   one or more processor cores configured to operate in a plurality of operating states, wherein each operating state corresponds to a respective load current drawn by the one or more processor cores;
   a voltage regulator configured to provide an operating voltage to the one or more processor cores in response to receiving a voltage identifier signal that is indicative of the operating voltage; and
   a power management unit coupled to the voltage regulator and configured to provide a different voltage identifier signal for each of the plurality of operating states;
   wherein the power management unit is further configured to provide a voltage identifier signal that corresponds to an operating voltage that is lower than a nominal operating voltage for a given operating state in response to determining that the one or more processor cores is operating in an operating state in which the one or more processors is configured to maintain a load current below a predetermined amount;
   wherein in response to detecting a request to change the operating state to a new operating state in which the one or more processor cores is configured to draw more current than a current operating state, the power management unit is configured to provide a voltage identifier signal to increase the operating voltage to the nominal operating voltage;
   wherein the power management unit is configured to delay the request to change the operating state to the new operating state until the voltage regulator has increased the operating voltage to the nominal operating voltage.

8. The system as recited in claim 7, wherein the power management unit includes a storage configured to maintain a table that includes the plurality of operating states and a respective voltage identifier signal that corresponds to each operating state.

9. A method comprising:
   operating one or more processor cores in a plurality of operating states, wherein each operating state corresponds to a respective load current drawn by the one or more processor cores;
   a voltage regulator providing an operating voltage to the one or more processor cores in response to receiving a voltage identifier signal that is indicative of the operating voltage;
   a power management unit providing a different voltage identifier signal for each of the plurality of operating states; and
   the power management unit providing a voltage identifier signal that corresponds to an operating voltage that is lower than a nominal operating voltage for a given operating state in response to determining that the one or more processor cores is operating in an operating state in which the one or more processors is configured to maintain a load current below a predetermined amount;
   the power management unit providing a voltage identifier signal to increase the operating voltage to the nominal operating voltage in response to detecting a request to change the operating state to a new operating state in which the one or more processor cores is configured to draw more current than a current operating state;
   the power management unit delaying the request to change the operating state to the new operating state until the voltage regulator has increased the operating voltage to the nominal operating voltage.

10. The method as recited in claim 9, further comprising the power management unit maintaining a table that includes the plurality of operating states and a respective voltage identifier signal that corresponds to each operating state.

11. A non-transitory computer readable medium storing a data structure which is operated upon by a program executable on a computer system, the program operating on the data structure to perform a portion of a process to fabricate an integrated circuit including circuitry described by the data structure, the circuitry described in the data structure including:

one or more processor cores configured to operate in a plurality of operating states, wherein each operating state corresponds to a respective load current drawn by the one or more processor cores;

a voltage regulator configured to provide an operating voltage to the one or more processing cores in response to receiving a voltage identifier signal that is indicative of the operating voltage; and a power management unit coupled to the voltage regulator and configured to provide a different voltage identifier signal for each of the plurality of operating states;

wherein the power management unit is further configured to provide a voltage identifier signal that corresponds to an operating voltage that is lower than a nominal operating voltage for a given operating state in response to determining that the one or more processor cores is operating in an operating state in which the one or more processors is configured to maintain a load current below a predetermined amount;

wherein the power management unit is configured to delay a request to change the operating state to a new operating state until the voltage regulator has increased the operating voltage to the nominal operating voltage.

* * * * *